United States Patent
Girard et al.

(10) Patent No.: US 10,952,047 B2
(45) Date of Patent: Mar. 16, 2021

(54) DISTRIBUTED CONTENT FOR AIRCRAFT

(71) Applicant: Systems and Software Enterprises, LLC, Brea, CA (US)

(72) Inventors: Larry Girard, Brea, CA (US); Joseph Winston, Brea, CA (US)

(73) Assignee: SYSTEMS AND SOFTWARE ENTERPRISES, LLC, Brea, CA (US)

(*) Notice: Subject to any disclaimer, the term of this patent is extended or adjusted under 35 U.S.C. 154(b) by 114 days.

(21) Appl. No.: 16/048,047

(22) Filed: Jul. 27, 2018

(65) Prior Publication Data

US 2019/0037372 A1    Jan. 31, 2019

Related U.S. Application Data

(60) Provisional application No. 62/538,318, filed on Jul. 28, 2017.

(51) Int. Cl.

| | | |
|---|---|---|
| *H04W 4/44* | (2018.01) | |
| *H04W 12/08* | (2021.01) | |
| *H04L 29/08* | (2006.01) | |
| *H04L 29/06* | (2006.01) | |
| *H04W 12/02* | (2009.01) | |
| *H04W 4/48* | (2018.01) | |
| *G06Q 30/02* | (2012.01) | |
| *H04W 4/20* | (2018.01) | |
| *H04W 4/42* | (2018.01) | |

(52) U.S. Cl.
CPC .......... *H04W 4/44* (2018.02); *G06Q 30/0226* (2013.01); *H04L 63/0428* (2013.01); *H04L 63/102* (2013.01); *H04L 67/06* (2013.01); *H04L 67/2857* (2013.01); *H04L 67/303* (2013.01); *H04W 4/203* (2013.01); *H04W 4/48* (2018.02); *H04W 12/02* (2013.01); *H04W 12/08* (2013.01); *H04L 67/12* (2013.01); *H04L 67/306* (2013.01); *H04W 4/42* (2018.02)

(58) Field of Classification Search
CPC ............ G06Q 30/0226; H04L 63/0428; H04L 63/102; H04L 67/06; H04L 67/12; H04L 67/2857; H04L 67/303; H04L 67/306; H04W 12/02; H04W 12/08; H04W 4/203; H04W 4/42; H04W 4/44; H04W 4/48
See application file for complete search history.

(56) References Cited

U.S. PATENT DOCUMENTS

| | | | | |
|---|---|---|---|---|
| 9,087,193 | B2 * | 7/2015 | Wahler | H04L 29/08144 |
| 9,226,000 | B1 * | 12/2015 | Knight | H04N 21/231 |
| 9,893,976 | B2 * | 2/2018 | Wahler | H04W 4/029 |
| 9,967,595 | B1 * | 5/2018 | Provost | H04N 21/2146 |
| 9,998,946 | B1 * | 6/2018 | Lentz | H04W 84/12 |

(Continued)

*Primary Examiner* — Jerry B Dennison
(74) *Attorney, Agent, or Firm* — Umberg Zipser LLP

(57) ABSTRACT

Systems and methods are described for transferring content to and from an aircraft. Content can be divided into one or more subsets that each contains some or all of the content. Each of the subsets can be transferred to one or more mobile computing devices via a wireless network, and then transferred from the mobile computing device one onboard or departed from the aircraft. In this manner, content can be updated more regularly and at a lesser expense than traditional avenues for updating content. Rewards can be used to incentivize participants to accept the temporary storage of a subset of the content on their mobile computing device.

20 Claims, 2 Drawing Sheets

(56) References Cited

U.S. PATENT DOCUMENTS

| | | | |
|---|---|---|---|
| 10,069,895 B2* | 9/2018 | Sinivaara | H04N 21/4524 |
| 2005/0129239 A1* | 6/2005 | Farley | H04B 7/18502 |
| | | | 380/270 |
| 2006/0031748 A1* | 2/2006 | Brady, Jr. | H04N 21/2225 |
| | | | 715/201 |
| 2010/0138879 A1* | 6/2010 | Bird | H04H 20/62 |
| | | | 725/76 |
| 2010/0150166 A1* | 6/2010 | Carmel | H04H 20/02 |
| | | | 370/437 |
| 2010/0169780 A1* | 7/2010 | Bryant-Rich | G11B 27/105 |
| | | | 715/719 |
| 2011/0257834 A1* | 10/2011 | Hebb | G06Q 10/08 |
| | | | 701/31.4 |
| 2015/0150061 A1* | 5/2015 | Bleacher | H04N 21/26258 |
| | | | 725/76 |
| 2016/0127334 A1* | 5/2016 | Bangole | H04L 67/12 |
| | | | 713/171 |
| 2016/0285589 A1* | 9/2016 | Mukkavilli | H04L 1/1819 |
| 2016/0344792 A1* | 11/2016 | Sinivaara | H04N 21/43637 |
| 2017/0026676 A1* | 1/2017 | Watson | H04N 21/25808 |
| 2017/0353506 A1* | 12/2017 | Warrick | H04L 65/4076 |
| 2018/0020042 A1* | 1/2018 | Couleaud | H04L 67/10 |
| 2018/0027036 A1* | 1/2018 | Watson | H04B 7/18506 |
| | | | 709/219 |
| 2018/0027037 A1* | 1/2018 | Watson | H04L 67/2842 |
| | | | 709/219 |
| 2018/0146505 A1 | 5/2018 | Lauer | |
| 2019/0037372 A1* | 1/2019 | Girard | H04L 67/303 |

* cited by examiner

Step 205: providing access to a content server having at least one set of content

Step 210: providing access to device information concerning a plurality of mobile computing devices, wherein the device information comprises flight information, a device type and an available storage

Step 215: selecting a set of content to be transferred to a first aircraft using a processor

Step 220: the processor encrypting the content and dividing the selected set of content into two or more subsets of content, wherein each of the subsets comprises some or all of the content

Step 225: selecting a set of the plurality of mobile computing devices based at least in part on the device information

Step 230: transferring each subset of content to a distinct mobile computing device of the selected set of devices

Figure 2

DISTRIBUTED CONTENT FOR AIRCRAFT

This application claims priority to U.S. provisional application having Ser. No. 62/538,318 filed on Jul. 28, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is content distribution for aircraft and other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Airlines are requesting more and more content be added to and removed from aircraft as often as possible. Traditionally, content is added to an in-flight entertainment (IFE) system using secure digital (SD) cards or other portable storage solutions once a month (although it can be done more often as desired). Data is typically offloaded via a wireless network using a WIFI or cellular (e.g., 3G/4G/5G) data connection when the aircraft is in its own country or otherwise landed and if cellular roaming is permitted/used. News and other information can also be downloaded to the in-flight entertainment system over a wireless network when the aircraft is at a gate, for example.

However, such processes can be problematic as cellular networks and roaming on a network are not always accessible, or can be costly to utilize for transferring data to and from an aircraft. In addition, airlines may not want to spend the time and money to manually update content using ground personnel, for example.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for more frequently transferring content to or from an aircraft, and preferably without the need for dedicated personnel.

SUMMARY OF THE INVENTION

The inventive subject matter provides apparatus, systems and methods in which content can be transferred to or from an aircraft via one or more mobile computing devices. A set of content to be transferred can be identified. Based on the number of mobile computing devices available and their available storage space, the set of content can be divided into a plurality of subsets of content, each of which can be transferred to at least one of the mobile computing devices. Preferably the content is encrypted while being transferred.

The subset of content on the mobile computing device can then be downloaded to a server of an aircraft's in-flight entertainment system when the mobile computing device connects to a wireless access point on board the aircraft or connects to the server via a wired connection such as USB.

Users can be incentivized to allow the temporary storage of content on their devices via a reward system. Rewards may be offered once the user accepts the content on the user's device or after the content is downloaded from the user device. Rewards can include, for example, a monetary reward, a discount coupon, an in-flight offering, an upgraded seat, priority boarding, frequent flier points, or an entry into a drawing for a give-away.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 2 illustrates a flow chart of one embodiment of a method for transferring content to or from an aircraft.

DETAILED DESCRIPTION

Figure 1:
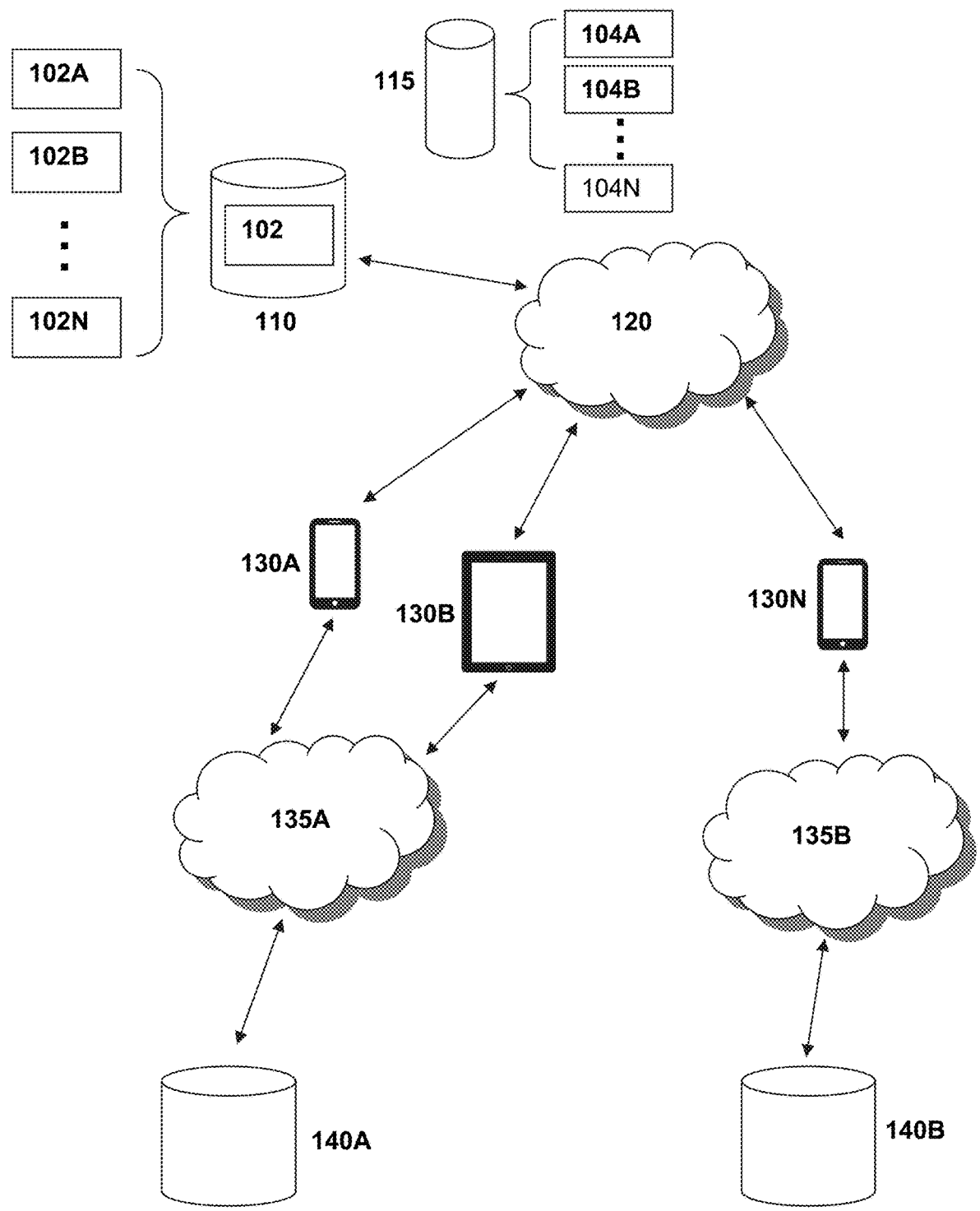
FIG. 1 illustrates a diagram of one embodiment of a system for transferring content to or from an aircraft.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

The inventive subject matter describes systems and methods for transferring content to and from aircraft or other vehicles. Although the below discussion focuses on an aircraft, it is contemplated that the systems and methods discussed herein could likewise be used on ships, trains, busses, and other vehicles.

In one contemplated embodiment, an example of which is shown in FIG. 1, a system 100 can be utilized to transfer content to or from an aircraft server 140A or 140B as often as necessary—for example, before every flight—using one or more mobile computing devices 130A-130N as carriers for the content. For example, the desired content that the airline would like to transfer to or from the aircraft, or a portion thereof, could be stored in the memory of one or more of the mobile computing devices 130A-130N. It is contemplated that the mobile computing devices 130A-130N could be operated or owned by passengers or crew members or other personnel.

For example, system 100 can include a content server 110 having at least one set of content 102. System 100 can further include a device server 115 having a plurality of profiles 104A-104N. Each of the profiles 104A-104N is associated with a mobile computing device 130A-130N. Each of the profiles can comprise flight information associated with the user of the mobile computing device, a device type and an available storage of the device, among other information.

System 100 can further include a processor that is configured to select (i) a set of content 102 from the content server 110 and (ii) a set of mobile computing devices 130A-130N based at least in part on the profiles 104A-104N associated with each of the mobile computing devices 130A-130N. The processor is further configured to create a plurality of subsets 102A-102N of the set of content 102 based on the available space of each of the mobile computing devices 130A-130N, a total size of the content 102 to be transferred, and the number of mobile computing devices 130A-130N selected.

Preferably, the processor is further configured to encrypt the subsets of content 102A-102N before the content is transferred to the selected mobile computing devices 130A-130N.

Each of the subsets of content 102A-102N is transferred to at least one distinct mobile computing device 130A-130N.

As used herein, the term mobile computing device includes, for example, portable computers with dedicated storage including, for example, tablet PCs, smart phones, and smart watches. Preferred mobile computing devices are handheld and easily transported, and also can preferably upload and download data/content in the background (e.g., without disrupting a user from accessing the device). It is especially preferred that such devices can continue to upload or download content even where the device is locked or not in use (though powered on). Thus, for example, while a laptop could be used, the typical size and weight of a laptop, and its typical inability to transfer data only when being used (e.g., in an open state) makes it less desirable.

Advantageously, the inventive concepts described herein can work in conjunction with the current solution using SD cards or other portable storage solutions and cellular or other wireless networks.

As a further example, while passengers and/or personnel are waiting at the gate or other location in the airport before boarding the aircraft, or while away from the airport, and are connected to a Wireless Access Point (WAP) 120 which could be a cellular network or a WIFI network, for example, content can be pushed (uploaded) to one or more mobile devices 130A-130N (preferably in the background) of the passengers and/or personnel. It is especially preferred that the content to be stored in the mobile computing devices 130A-130N is encrypted prior to being transferred to prevent unauthorized access to the content. Such access can also be prevented by dividing the content prior to transfer into sets where portions of files within the content are deliberately missing so that a portion of some or all of each file is not stored on a single device.

To entice passengers and/or crew members to allow a portion of their storage to be temporarily used for this purpose, it is contemplated that airlines could offer a reward or drawing entry to the individual via the system 100. Such awards could be for example, monetary gifts, discounts on a future flight, in-flight rewards such as a free or discounted meal, drink or movie, upgraded seating, priority boarding, free checked bag, frequent flier points, or an entry into a drawing for a give-away. Such rewards could be based, for example, on one or more of a passenger's status with the airline, a length of the flight associated with the passenger, a passenger's frequency of filing with the airline, a device type, an available storage of the device, and a size of the content permitted to be downloaded on the device. The reward offered or given could also be based on a reliability of the passenger to download and transfer the content to or from the aircraft, which may itself be based on past successes or failures by that passenger in transferring content to or from an aircraft.

It is further contemplated that the reward could be a point system where different amounts of points are redeemable for rewards having different tiers of points required for redemption.

This likely could be done with the airlines' frequent flyers, as their information is already in the airlines' system, and they are more likely to have downloaded the airlines' App for their mobile computing device. Download of the content could be coordinated with the software App installed on the mobile computing device and can be downloaded in the background and stored in the airline's App cache or any other dedicated space created by the App.

As discussed above, passengers could affirmatively accept transfer of data on to their mobile computing device for later transfer to or from an aircraft. It is contemplated that this selection could be done via a software App installed on the device or a website. With the selection, it is further contemplated that the user could select how much space the user would be willing to utilize for the transfer, and based on that selection, the reward offered to the user for completion of the transfer to or from an aircraft may vary.

It is contemplated that crew members or other personnel could carry dedicated mobile devices to move data to and from an aircraft.

Once on the aircraft, content from the one or more mobile computing devices 130A-130N can be downloaded to a server 140A or 140B of an in-flight entertainment system disposed on the aircraft, preferably over a wireless connection 135A or 135B without any action required from passengers or crew members once the device is connected to the network 135A or 135B. In a similar manner, the airline-selected content already on the server 140A or 140B of the in-flight entertainment system could be downloaded to the authorized mobile devices while passengers or personnel are on board or near the aircraft to either be uploaded to the ground server 110 via a WAP of the airport, a different wireless connection, or to other aircraft, for example. The content transferred to the server 140A or 140B of the IFE system can be made available to passengers on a passengers' Seat Display Unit (SDU) of the IFE, a passenger's mobile device, or other display, after the content is downloaded from the one or more mobile computing devices 130A-130N to the IFE's network and decrypted. Such decryption may occur directly at the SDU or passenger device, for example, or could occur on the server prior to streaming content to the SDU or passenger device.

It is also contemplated that the content on the one or more mobile computing devices 130A-130N could be transferred to the server 140A or 140B of the in-flight entertainment systems via a wired connection. Such connection could include a USB port or other commercially suitable interface that may be disposed at a seat row, for example. This could permit powering of the device(s) via the port and transfer of the data without impacting the wireless network of the aircraft.

Thus, once passengers agree to share space on their devices, nothing else is required but the passengers to connect to the different wireless networks as everything else would occur in the background.

The inventive concept advantageously allows authorized data to be carried both on and off an aircraft without disturbing passengers or crew members. Such data could include, for example, movie or television shows to be loaded for passenger viewing on the aircraft, audio files, news or other information, and airline specific data (e.g., information on passengers, specific light settings for a flight, etc.). Such data could also include data logs from the IFE Network that would generally be easier and less expensive to offload over mobile devices at any airport rather than wait for planes to return to their own countries. This is especially true where SIM card roaming is expensive.

It is contemplated that content stored on mobile devices would be encoded in a redundant manner using an Error-Correcting Code (ECC). The encoding could be based, for example, on the technique known as Forward Error Correction (FEC) in order to control errors in the data transmission over unreliable channels (here, the mobile computing devices).

To avoid situations where a full set of content is not unloaded or offloaded to or from an aircraft, it is preferred that the desired content is divided into parts, which are then duplicated and stored across several mobile computing devices. The data could be divided and copied into equal copies of the same parts or could be striped across the devices such that at least some of the data on two of the devices would overlap, as desired. This helps ensure that all of the desired data is downloaded to or uploaded from an aircraft, as passengers may miss a flight, the device's battery could deplete prior to finishing downloading or uploading of the data, or there could be other issues that impact transfer of the data. By having a plurality of mobile computing devices each bringing a portion or all of the content to an aircraft, this reduces the risk of incomplete data sets.

Thus, for example, a set of content for transfer to an aircraft could be divided into ten equal or unequal portions depending on the device's available for temporary storage of the content. Those ten subsets of the content could then be transferred to thirty distinct devices, such that each subset of content is stored on three distinct devices. This increases the likelihood that each subset of content will be successfully transferred to the aircraft in this example. The individual subsets could be distinct from one another, or overlapping as discussed above.

It is further contemplated that a subset or set of content may be preferably transferred to a user or users who have multiple flights within a certain period of time, such that the data/content transferred to the user's portable computing device can be downloaded to two or more aircraft. This could occur where a user has a layover on the way to the user's final destination, and switches aircraft, but where both aircraft require the same content.

FIG. 2 illustrates one embodiment of a method for transferring content to or from an aircraft using a plurality of mobile computing devices. In step 205, access is provided to a content server having at least one set of content, which may include movies, audio files, news, or other content/data. In step 210, access is also provided to device information regarding a plurality of mobile computing devices that have indicated willingness to temporarily store content for later transfer. Such device information can include, for example, flight information, a device type and an available storage of each device. Device information could further include, for example, a user profile associated with the device and/or a reliability score of a user associated with the device, wherein the reliability score is determined by the processor and based at least in part upon a number of previous successful transfers of content by that user.

In step 215, a set of content to be transferred to a first aircraft can be selected using a processor. The content is encrypted in step 220 and divided into two or more subsets of content, wherein each of the subsets comprises some or all of the content.

In step 225, a set of the plurality of mobile computing devices is selected by the processor based at least in part on the device information and the amount of content to be transferred. Thus, for example, a small amount of content to be transferred may require a lower total number of devices than a larger amount of content. The number of devices may also depend on the available storage space of each device, and the reliability or predicted reliability of the user associated with each device.

In step 230, each subset of content can be transferred to a distinct mobile computing device of the selected set of devices, for later transfer to the aircraft or a ground-based server, for example. It is contemplated that this transfer of data can occur via a wireless network, which could include a cellular network or WIFI network. Such transfer could occur at the airport or away from the airport such as at a user's home or hotel, for example.

As discussed above, transfer of data to an aircraft could occur via the aircraft's wireless network or a wired connection where the mobile computing device is plugged into a USB or other suitable port for transfer of data to or from the mobile computing device.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for transferring content to or from an aircraft, comprising:
    providing access to a content server having at least one set of content;
    providing access to device information concerning a plurality of mobile computing devices, wherein the device information comprises flight information, a device type and an available storage;
    selecting a set of content to be transferred to a first aircraft using a processor;
    the processor encrypting the content and dividing the selected set of content into two or more subsets of content, wherein each of the subsets comprises some of the content, and wherein each of the subsets comprises missing portions of each of the files of the content to prevent viewing of the content by the mobile computing device; and
    generating a list of the plurality of mobile computing devices based at least in part on the device information and at least one upcoming flight associated with each of the mobile computing devices;
    selecting a set of the plurality of mobile computing devices from the list of mobile computing devices based on a number of upcoming flights associated with each of the mobile computing devices on the list, wherein mobile computing devices associated with two or more flights are prioritized over mobile computing devices associated with a single flight; and
    transferring a subset of content to each mobile computing device of the selected set of devices and transferring at least some of the set of content to the first aircraft using a terrestrial wireless network, wherein the content is encoded on each mobile computer device in a redundant manner using an Error-Correcting Code (ECC).

2. The method of claim 1, wherein the device information further includes a user profile associated with the device.

3. The method of claim 1, wherein the device information further includes a reliability score of a user associated with the device, wherein the reliability score is determined by the processor and based at least in part upon a number of previous successful transfers of content by that user.

4. The method of claim 1, wherein the step of transferring occurs via a terrestrial wireless connection.

5. The method of claim 1, wherein the step of transferring occurs on an aircraft via a wireless connection.

6. The method of claim 1, wherein the step of transferring occurs on an aircraft via a wired connection.

7. The method of claim 1, wherein data from a first subset of content at least partially overlaps with data from a second subset of content.

8. The method of claim 1, further comprising transferring each subset of content to at least two distinct mobile computing devices.

9. The method of claim 1, wherein the content is transferred to the distinct mobile computing device via a software App installed on the device.

10. The method of claim 1, further comprising:
    determining an amount of storage available on each of the mobile computing devices; and
    dividing the selected set of content into the two or more subsets of content based on the available storage of each of the devices.

11. The method of claim 10, wherein a first subset of content is larger than a second subset of content.

12. The method of claim 2, further comprising presenting a reward to a user associated with the device based on the user profile.

13. The method of claim 12, wherein the reward is based at least in part on an amount of content transferred to or from the device or a number of successful transfers of content by that user.

14. The method of claim 12, wherein the reward comprises a monetary reward, a discount coupon, an in-flight offering, an upgraded seat, priority boarding, frequent flier points, or an entry into a drawing for a give-away.

15. A system for transferring content to or from an aircraft, comprising:
    a content server having at least one set of content;
    a device server having a plurality of profiles, each associated with a mobile computing device, and wherein each of the profile comprises a flight information associated with the user of the mobile computing device, a device type and an available storage of the device;
    a processor configured to (i) select a set of content from the content server, (ii) generate a list of the plurality of mobile computing devices based at least in part on the device information and at least one upcoming flight associated with each of the mobile computing devices, and (iii) select a set of mobile computing devices from the list based on the number of upcoming flights associated with each mobile computing device, wherein mobile computing devices associated with two or more flights are prioritized over mobile computing device associated with a single flight;
    wherein the processor is further configured to create a plurality of subsets of the set of content based on the available space of each device, a total size of the content to be transferred, and the number of devices selected;
    wherein the processor is further configured to encrypt the subsets of content; and wherein the processor is further configured to transfer each of the plurality of subsets of content to (i) distinct ones of the selected set of mobile computing devices and (ii) to the first aircraft using a terrestrial wireless network, wherein the content is encoded on each mobile computer device in a redundant manner using an Error-Correcting Code (ECC).

16. The system of claim 15, wherein each of the profiles further includes information about a user associated with the mobile computing device for that profile.

17. The system of claim 15, wherein the plurality of subsets collectively comprises multiple copies of the set of content.

18. The system of claim 15, wherein the plurality of subsets of content comprises first and second subsets, and wherein a size of the first subset is different from a size of the second subset.

19. The system of claim 15, wherein the processor is further configured to present a reward to a user of the mobile computing device after the subset of content is transferred from the device.

20. A method for transferring content to or from an aircraft, comprising:

providing access to a content server having at least one set of content;

providing access to device information concerning a plurality of mobile computing devices, wherein the device information comprises flight information, a device type and an available storage;

selecting a set of content to be transferred to a first aircraft from the content server using a processor;

the processor encrypting the content and dividing the selected set of content into two or more subsets of content, wherein each of the subsets comprises some of the content;

providing access to the set of content on the content server to the first aircraft via a wireless network;

generating a list of the plurality of mobile computing devices based at least in part on the device information and at least one upcoming flight associated with each of the mobile computing devices;

selecting a set of the plurality of mobile computing devices from the list of mobile computing devices based on a number of upcoming flights associated with each of the mobile computing devices on the list, wherein mobile computing devices associated with two or more flights are prioritized over mobile computing devices associated with a single flight; and transferring a subset of content to each mobile computing device of the selected set of devices, wherein the content is encoded on each mobile computer device in a redundant manner using an Error-Correcting Code (ECC).

* * * * *